US010841647B2

(12) United States Patent
Zavesky et al.

(10) Patent No.: US 10,841,647 B2
(45) Date of Patent: Nov. 17, 2020

(54) NETWORK AGGREGATION OF STREAMING DATA INTERACTIONS FROM DISTINCT USER INTERFACES

(71) Applicant: AT&T Intellectual Property I, L.P., Atlanta, GA (US)

(72) Inventors: Eric Zavesky, Austin, TX (US); Zhu Liu, Marlboro, NJ (US); David Crawford Gibbon, Lincroft, NJ (US); Raghuraman Gopalan, Dublin, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/023,656

(22) Filed: Jun. 29, 2018

(65) Prior Publication Data
US 2020/0007932 A1    Jan. 2, 2020

(51) Int. Cl.
*H04N 21/4402* (2011.01)
*H04N 21/44* (2011.01)

(52) U.S. Cl.
CPC ........... *H04N 21/440245* (2013.01); *H04N 21/44008* (2013.01); *H04N 21/44016* (2013.01)

(58) Field of Classification Search
CPC ..... H04N 21/440245; H04N 21/44016; H04N 21/44008
See application file for complete search history.

(56) References Cited

U.S. PATENT DOCUMENTS

| | | | |
|---|---|---|---|
| 8,725,795 B1 | 5/2014 | Amacker | |
| 8,943,526 B2 | 1/2015 | Rivera et al. | |
| 9,015,746 B2 | 4/2015 | Holmdahl et al. | |
| 9,202,251 B2 | 12/2015 | Bist et al. | |
| 9,361,353 B1* | 6/2016 | Aristides | G06F 17/30595 |
| 9,681,185 B2 | 6/2017 | South et al. | |
| 9,681,186 B2 | 6/2017 | Lehtiniemi et al. | |
| 9,706,235 B2 | 7/2017 | Petrovic et al. | |
| 9,743,118 B2 | 8/2017 | Newell et al. | |
| 9,794,624 B2 | 10/2017 | Morris et al. | |
| 9,852,480 B1 | 12/2017 | Kimball et al. | |
| 9,888,279 B2 | 2/2018 | Ishtiaq et al. | |
| 2009/0144768 A1* | 6/2009 | Nagaraja | G06F 3/00 |
| 2011/0169603 A1 | 7/2011 | Fithian et al. | |
| 2015/0074698 A1 | 3/2015 | Pinto et al. | |
| 2016/0337694 A1* | 11/2016 | South | H04N 21/44213 |

* cited by examiner

*Primary Examiner* — Anthony Bantamoi
(74) *Attorney, Agent, or Firm* — Hartman & Citrin LLC

(57) ABSTRACT

Concepts and technologies directed to network aggregation of streaming data interactions from distinct user interfaces are disclosed herein. Embodiments can include a network server that includes a processor and a memory that has computer-executable instructions. Upon execution, the processor can cause the network server to perform operations. The operations can include retrieving a content package from a content data store. The operations also can include splicing video content of the content package into a plurality of content segments and assigning a boundary time marker to each of the plurality of content segments. The operations can include creating a segment overlay field for each of the plurality of content segments, where each segment overlay field can be configured to receive a client generated metric corresponding to the boundary time marker for each of the content segments. The operations can include providing the content package to a plurality of user equipment.

15 Claims, 6 Drawing Sheets

NETWORK AGGREGATION OF STREAMING DATA INTERACTIONS FROM DISTINCT USER INTERFACES

BACKGROUND

The use and presentation of multimedia content on a variety of mobile and fixed platforms have rapidly proliferated. In modern communication networks, users can connect with each other via user equipment from various locations. By taking advantage of storage paradigms, such as cloud-based storage infrastructures, reduced form factor of media players, and high-speed wireless network capabilities, users can readily access and consume multimedia content regardless of the physical location of the users or the multimedia content. Instances of multimedia content, such as video content, often includes a series of related images which, when shown in succession, impart an impression of motion, together with accompanying sounds, if any. Such multimedia content can be accessed from various sources including local storage such as hard drives or optical disks, remote storage such as Internet sites or cable/satellite distribution servers, over-the-air broadcast channels, or the like. Access to multimedia content may be obtained from a continually growing number of content sources via a diverse set of communications mediums. For example, digital cable television and/or satellite television may enable the broadcast of hundreds of channels of content. Likewise, video content may be generated by a user and provided over a computer network via a potentially unlimited number of sources. As a result, a viewer may find it increasingly challenging to discover interesting and relevant multimedia content.

SUMMARY

The present disclosure is directed to network aggregation of streaming data interactions from distinct user interfaces, according to various embodiments. As used herein, the phrase "distinct user interface(s)" refers to a user interface of a user equipment that is configured to present a content package via a display and receive input via the user interface so as to provide one or more instances of content feedback associated with the content package and video content therein. According to one aspect of the concepts and technologies disclosed herein, a system is disclosed. In some embodiments, the system can include a processor and a memory. In some embodiments, the processor and the memory can be provided by a network server. The memory can store computer-executable instructions that, when executed by the processor, cause the processor to perform operations. In some embodiments, the operations can include retrieving a content package from a content data store. The content data store can be communicatively coupled to the network server via a network. The operations also can include splicing video content of the content package into a plurality of content segments. The operations also can include assigning a boundary time marker to each of the plurality of content segments of the video content such that the video content is assigned a plurality of boundary time markers. The operations also can include creating a segment overlay field for each of the plurality of content segments of the video content such that a plurality of segment overlay fields are created for the video content, where each segment overlay field can be configured to receive a client generated metric corresponding to the boundary time marker for each of the plurality of content segments. In some embodiments, the operations also can include overlaying the plurality of segment overlay fields on the video content of the content package. In some embodiments, the operations also can include instructing a content player of each of a plurality of user equipment to display the plurality of segment overlay fields at the plurality of boundary time markers. The operations can further include providing the content package to the plurality of user equipment. In some embodiments, the operations can include receiving a plurality of segmented content responses from the plurality of user equipment. The segmented content responses can be received in response to providing the content package to each of the plurality of user equipment.

In some embodiments, the operations can further include extracting client generated metrics from the plurality of segmented content responses. The operations can further include aggregating the client generated metrics into a generated content leaderboard. In some embodiments, the operations also can include providing a leaderboard portal to a content generation user equipment associated with the content package. The content generation user equipment may have produced or otherwise initially generated the content package and provided the content package to the content data store. In some embodiments, the operations can include identifying a dynamic content channel for at least one of the plurality of user equipment based on the generated content leaderboard. In some embodiments, the operations can include generating a content creation request for the at least one of the plurality of user equipment, where the content creation request can identify the dynamic content channel.

According to another aspect of the concepts and technologies disclosed herein, a method is disclosed, according to an embodiment. The method can include retrieving, by a processor executing on a network server, a content package from a content data store. In some embodiments, the network server can execute one or more engine that configure the processor, such as but not limited to, a segmentation engine and/or an aggregation analysis engine. In some embodiments, the operations can include splicing, by the processor executing on the network server, video content of the content package into a plurality of content segments. The operations also can include assigning, by the processor executing on the network server, a boundary time marker to each of the plurality of content segments of the video content such that the video content is assigned a plurality of boundary time markers. The operations also can include creating, by the processor executing on the network server, a segment overlay field for each of the plurality of content segments of the video content such that a plurality of segment overlay fields are created for the video content, where each segment overlay field can be configured to receive a client generated metric corresponding to the boundary time marker for each of the plurality of content segments. In some embodiments, the operations can include overlaying, by the processor executing on the network server, the plurality of segment overlay fields on the video content of the content package, and instructing, by the processor executing on the network server, a content player of each of a plurality of user equipment to display the plurality of segment overlay fields at the plurality of boundary time markers. The operations also can include providing, by the processor executing on the network server, the content package to the plurality of user equipment.

In some embodiments, the operations can include receiving, by the processor executing on the network server, a plurality of segmented content responses from the plurality of user equipment. In some embodiments, the operations can include extracting, by the processor executing on the network server, client generated metrics from the plurality of segmented content responses, and aggregating, by the processor executing on the network server, the client generated metrics into a generated content leaderboard. In some embodiments, the operations can include providing, by the processor executing on the network server, a leaderboard portal to a content generation user equipment associated with the content package. In some embodiments, the operations can include identifying, by the processor executing on the network server, a dynamic content channel for at least one of the plurality of user equipment based on the generated content leaderboard. In some embodiments, the operations can include generating, by the processor executing on the network server, a content creation request for the at least one of the plurality of user equipment, where the content creation request can identify the dynamic content channel.

According to yet another aspect, a computer storage medium is disclosed. The computer storage medium can have computer-executable instructions stored thereon. When the computer-executable instructions are executed by a processor, the processor can perform operations. In some embodiments, the processor can be included in a computer system, such as a network server that can communicatively couple with a network. In some embodiments, the operations can include retrieving a content package from a content data store. The operations can include splicing video content of the content package into a plurality of content segments. The operations can include assigning a boundary time marker to each of the plurality of content segments of the video content such that the video content is assigned a plurality of boundary time markers. The operations can include creating a segment overlay field for each of the plurality of content segments of the video content such that a plurality of segment overlay fields are created for the video content, where each segment overlay field can be configured to receive a client generated metric corresponding to the boundary time marker for each of the plurality of content segments. In some embodiments, the operations can include overlaying the plurality of segment overlay fields on the video content of the content package, and instructing a content player of each of the plurality of user equipment to display the plurality of segment overlay fields at the boundary time markers. The operations can include providing the content package to a plurality of user equipment.

In some embodiments, the operations can include receiving a plurality of segmented content responses from the plurality of user equipment. The operations can include extracting client generated metrics from the plurality of segmented content responses, and aggregating the client generated metrics into a generated content leaderboard. In some embodiments, the operations can include providing a leaderboard portal to a content generation user equipment associated with the content package. The operations can include identifying a dynamic content channel for at least one of the plurality of user equipment based on the generated content leaderboard. In some embodiments, the operations can include generating a content creation request for the at least one of the plurality of user equipment, where the content creation request can identify the dynamic content channel.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
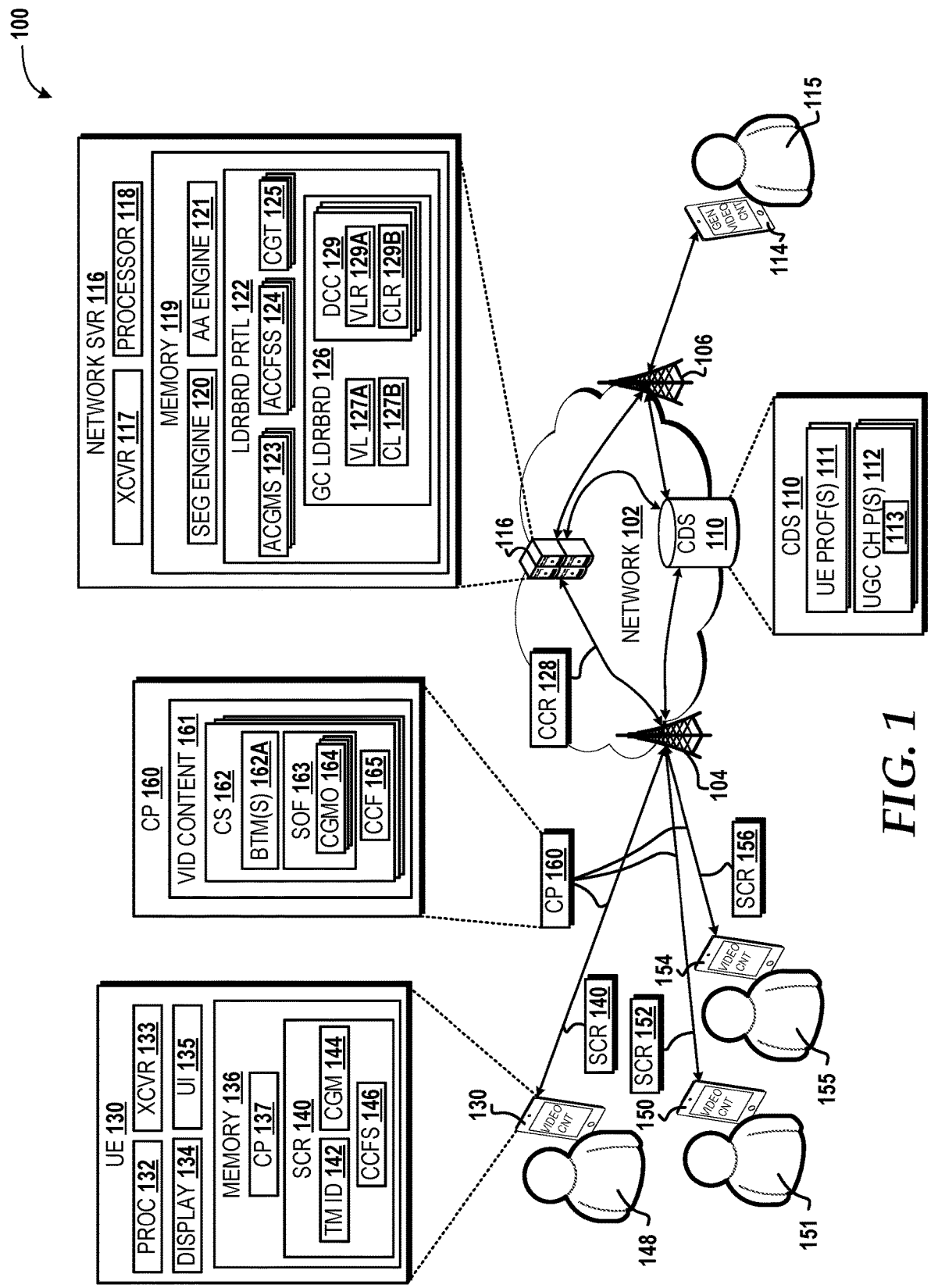
FIG. 1 is a block diagram illustrating an example operating environment of a system for network aggregation of streaming data interactions from distinct user interfaces, according to an illustrative embodiment.

The following detailed description is directed to network aggregation of streaming data interactions from distinct user interfaces. Conventional multimedia content may not provide a mechanism for allowing viewers to rate or otherwise provide feedback to a content producer. As such, the content producer may use a conventional system to receive feedback as to how many users liked or disliked certain content instances (e.g., videos), but may not be privy as to the exact portions within the video content and/or reasons for why the positive or negative feedback was given by the viewer. Moreover, conventional content platforms may not allow viewers to interact with content and/or vote for topics within the content in order to drive or otherwise assist in the generation of content by a content producer. Therefore, embodiments of the present disclosure can provide a system that includes a network server that resides within a network that can interface and communicatively couple with a content data store that can be configured as a content hosting platform. The network server can communicatively couple with multiple users via user equipment. The system can receive requests for when a user would like to view video content and identify the title and/or general kind of video content that is being requested. The system can transform a content package corresponding to the video content by splicing the video content into multiple portions, and enabling the user to rate and provide feedback for each portion of video content. In some embodiments, the system can instruct the user equipment to provide a segmented content response to the network server in response to the user viewing the video content and providing feedback at a portion of video content. In some embodiments, the system can generate or otherwise provide a leaderboard that can allow points and/or values to be assigned to portions of video content. The leaderboard can also enable viewership analytics and comment analytics to allow for feedback to content generation producers. The system can assign the video content to certain topics or categories, and dynamically update the rankings of video content and/or a content channel that has multiple instances of video content. This can allow the content generation producers to track the popularity of the content and provide suggestions to producers as to what content should be generated. This can further drive decisions as to what type of content should be made and certain traits about the content, such as how long to make the video content. The system can also propose additional content that the user can watch, such as if the user liked a car chase scene and video content related to home improvement. This can allow for customization, producers of content (e.g., content generation users) to make additional videos based on the feedback, and refinement suggestions, such as types of topics that should be addressed in certain segments of video content.

In some embodiments, the system can auto-detect new video content and dynamically create channels by assembling one or more instances of video content from multiple individual channels of content generation producers. The dynamic content channel can be based on similarity of topics, popularity among viewers, and/or other ratings from viewers. In some embodiments, the system can provide creation guidance to content generation producers by analyzing feedback, characteristics of a content package (e.g., length and video quality), and association with a topic relative to other video content on the leaderboard. The system can provide suggestions to content generation producers as to specific types of video content that should be produced within a specific topic and/or category, such as ocean views captured by a helmet-mounted camera from extreme surfers. In some embodiments, the system can recommend video content that should be included in dynamic content channels for a group of viewers who share common interests based on queries and/or feedback. In some embodiments, a content generation producer can access a leaderboard portal to enter a seed term (e.g., a query string that corresponds to a topic of video content), and the system can generate a new dynamic content channel by scanning available video content and content generated metrics from the leaderboard so as to provide new channels that will likely be popular with customers. By this, the system can increase the speed with which new content is created and provided to viewers, thereby allowing for more highly tuned and targeted content creation. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for network aggregation of streaming data interactions from distinct user interfaces will be described, according to an illustrative embodiment. The operating environment 100 shown in FIG. 1 includes a communications network ("network") 102, a network server 116, a content data store ("CDS") 110, a network access point 104, a network access point 106, a content generated user equipment ("CGUE") 114 associated with a content generation user ("CGU") 115, a user equipment ("UE") 130 associated with a user 148, a UE 150 associated with a user 151, and a UE 154 associated with a user 155. Briefly, it should be understood that the network 102 can include almost any type of computer networks as well as communications networks. In various embodiments, the network 102 can include one or more of a radio access network, an evolved packet core network, a core network, an IP-based network, a transport network, an optical transport network, a circuit switched network, a mobile Wide Area Network, a combination thereof, or the like. It is understood that the network can communicate with one or more UEs (e.g., any of the UEs 130, 150, and 154) via one or more network access points (e.g., the network access points 104, 106) that can establish, provide, and maintain wireless and/or wired communication links. It should be understood that the examples provided are for illustration purposes only, and therefore should not be construed as limiting in any way.

In various embodiments, a network access point of the network 102 (e.g., the network access points 104, 106), can be communicatively coupled to network elements within the network 102 and computing devices outside of the network 102, such as any of the network server 116, the CDS 110, the UEs 130, 150, 154, and the CGUE 114. Although only two access points are shown (e.g., the network access points, 104, 106), the network 102 can support multiple access points configured the same as or similar to the network access points 104, 106. The network access points 104, 106 can provide wired and/or wireless communicative coupling and can include, but should not be limited to, one or more of a base transceiver station, a wireless router, a femtocell, an eNode B, a NodeB, a gNodeB (i.e., an access point that incorporates new radio access technology, such as LTE Advanced and other 5G technology), a multi-standard metro cell node, a customer premise edge node (e.g., an optical network terminal), and/or other network nodes or combinations thereof that are capable of providing communication to and/or from the network 102. As illustrated in FIG. 1, the network access points 104, 106 are configured in the form of a wireless tower that is communicatively coupled to the network 102, however it is understood that this may not be the case in all embodiments. It should be understood that the examples provided are for illustration purposes only, and therefore should not be construed as limiting in any way.

In various embodiments, the network 102 can be operated, in whole or in part, by a communication service provider that enables various network services to be offered to customers, such as one or more of the users 148, 151, and/or 155, via a customer's computing devices, such as any of the UEs 130, 150, and 154, respectively. The network 102 can host and/or be in communication with the CDS 110 that can host one or more instances of network services. For example, in some embodiments, the network 102, network server 116, and/or the CDS 110 can provide network services that include, but should not be limited to, communication services, on-demand video content services, video-sharing services, aggregation analysis services for video content and video-sharing services, compute services, analysis services, storage services, routing services, switching services, relay services, virtualized services, combinations thereof, and/or other virtualized or non-virtualized network services. It should be understood that the term "service" should be construed as one or more executing applications or any other computer-executable instructions that can provide a set of communication and/or network functions and operations on behalf of the network server 116, the CDS 110, and/or the network 102, and therefore the term "service" is not used, and shall not be construed or interpreted, to invoke or pertain to any abstract idea or any judicial exception. The network services can be used by a service provider, by third parties, and/or by customers via user equipment, servers, and/or other virtualized and/or non-virtualized computing systems. Further discussion of embodiments of the network 102 is provided with respect to FIG. 6. It should be understood that the examples provided are for illustration purposes only, and therefore should not be construed as limiting in any way.

In some embodiments, the CDS 110 can be associated with at least a portion of the network 102, such as the portion which is operated by the communications service provider. In other embodiments, the CDS 110 can be configured as a content hosting platform that is operated by a third party, such as but not limited to YOUTUBE Limited Liability Corporation that is a subsidiary of GOOGLE Incorporated in Mountain View, Calif., NETFLIX Incorporated, AMAZON VIDEO DIRECT that is a subsidiary of AMAZON DOT COM Incorporated, VIMEO Limited Liability Corporation, or any other audio and/or video content provider. In some embodiments, the network server 116 can request, access, retrieve, and/or otherwise obtain one or more instances of a content package that can include video content for playback and viewer consumption, such as a content package 160 that includes a video content 161 that can be executed and viewed on a user interface on any of the UEs 130, 150, and/or 154. The CDS 110 can include one or more instances of processing resources and/or memory resources that can provide storage of content packages, such as the content package 160. In some embodiments, the CDS 110 can store a plurality of UE profiles 111 and a plurality of user generated content channel profiles ("UGC channel profiles") 112. In some embodiments, a user (e.g., any of the users 148, 151, 155) can create a UE profile that can be stored among the plurality of UE profiles 111. Each user can configure his/her UE profile to indicate preferences about videos that he/she prefers. Each UE profile can store a list of content channels that the user likes to watch, such as via reference pointers to one or more content topics and/or one or more UGC channel profiles 112. Each of the UGC channel profiles 112 can correspond with a content generation user (e.g., the content generation user 115) that can upload video content that the user generated or otherwise produced. For example, in some embodiments, the content generation user 115 can use the CGUE 114 to capture, record, generate, create, and/or otherwise produce the video content 161 that can be packaged into the content package 160 and uploaded to the CDS 110, where the CDS 110 can store the content package 160 in memory. Users (e.g., any of the users 148, 151, 155) can use a user interface on their UE to access an application, a webpage, and/or portal to search for, and request playback of, the various video content, such as the content package 160. In some embodiments, the video content 161 of the content package 160 can provide various levels of image quality, audio quality, and/or other characteristics, such as three-dimensional video and/or a 360 degree video capability. In some embodiments, the UGC channel profiles 112 can include one or more identifiers of content types 113, where each content type 113 can be associated with a video topic, content type, or other characteristics (e.g., 3D video and/or 360 degree video) of one or more portions of an instance of video content. In some embodiments, the UGC channel profiles 112 can identify one or more instances of a content package (e.g., the content package 160), where each content package corresponds with at least one instance of video content generated by the CGUE 114. It should be understood that the examples provided are for illustration purposes only, and therefore should not be construed as limiting in any way.

In various embodiments, the content package 160 can include one or more instances of the video content 161 that can be executed on a UE that creates a user interface on a display so a user can view the video content 161. For example, the UE 130 can include a processor 132, a radio transceiver 133, a display 134, a user interface 135, and a memory 136. The processor 132 can include one or more hardware components that perform computations to process data, and/or to execute computer-executable instructions of one or more application programs, operating systems, and/or other software, to provide, at least in part, presentation of video content and performance of one or more operations and functions described herein. In some embodiments, the memory 136 can include volatile and/or non-volatile memory implemented in any method or technology for storage of information such as computer-readable instructions, data structures, program modules, or other data disclosed herein. It is understood that, use of the term "memory" (or variations thereof, such as but not limited to virtual memory) in the claims does not include, and shall not be construed to include, a wave or a signal per se and/or communication media. The memory 136 can store a content player 137 that can be executed by the processor 132 such that in response to the UE 130 receiving the content package 160, the content player 137 can present the video content 161 on the user interface 135 of the display 134 so that the user 148 may view (e.g., watch, listen, and/or interact with) the video content 161. In various embodiments, the video content 161 can configure the UE 130 to display visual images and/or produce audible sounds. Embodiments of a UE (e.g., any of the UEs 130, 150, 154, and/or the CGUE 114) can include, but should not be limited to, a mobile communications device, a desktop computer, a laptop computer, a tablet, a smart wearable device (e.g., smart-glasses, a smart watch, a fitness device), a smart home appliance (e.g., a smart refrigerator, a smart thermostat), a smart television, a smart dongle, a vehicle head unit, in-vehicle entertainment, and/or any other computing systems that can send and/or receive communications with the network 102. It is understood that zero, one, or more than one instances of the UEs 130, 150, and 154 can be present within various embodiments of the operating environment 100. It is understood that the UEs 150, 154 and the CGUE 114 can be configured substantially similar to the UE 130. Further discussion of an embodiment of a UE capable of implementing aspects of the operating environment 100 is provided below with respect to FIG. 5. It should be understood that the examples provided are for illustration purposes only, and therefore should not be construed as limiting in any way.

In various embodiments, the network server 116 includes physical hardware computing infrastructure that includes network communication interfaces, processing resources, and memory resources, such as a transceiver 117, a processor 118, and memory storage devices ("memory") 119. The transceiver 117 can provide communicative coupling between elements of the network 102 and allow for the sending and receiving of various data, such as the content package 160. The processor 118 can include one or more hardware components that perform computations to process data, and/or to execute computer-executable instructions of one or more application programs, operating systems, and/or other software, to provide, at least in part, any services or composition of services described herein. For example, the processor 118 can include one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. Further discussion of embodiments of the processor 118 as a processing unit and/or compute resources can be found with respect to FIG. 4. In various embodiments, the memory 119 can include one or more hardware components that perform storage operations, including temporary or permanent storage operations. In some embodiments, the memory 119 can include volatile and/or non-volatile memory implemented in any method or technology for storage of information such as computer-readable instructions, data structures, program modules, or other data disclosed herein. It is understood that, use of the term "memory" (or variations thereof, such as but not limited to virtual memory) and "computer storage medium" in the claims does not include, and shall not be construed to include, a wave or a signal per se and/or communication media.

In some embodiments, the memory 119 can store and include a segmentation engine 120, an aggregation analysis engine ("AAE") 121, and any other applications that provide computer-executable instructions to perform one or more functions and operations discussed herein. In some embodiments, the segmentation engine 120 and the AAE 121 can be combined into a single application or two or more applications. The segmentation engine 120 and/or the AAE 121 can configure the processor 118 to transform instances of a content package (e.g., the content package 160) that are available from the CDS 110. Thus, before the content package 160 is received by a UE for presentation of the video content 161, the network server 116 can configure the content package 160 to enable analysis and feedback from a user, thereby facilitating dynamic content channel creation. For example, in some embodiments, after the CGUE 114 creates and uploads the content package 160 to the CDS 110, the CDS 110 can store and retain the content package 160 in an initial state until being requested by a user via a UE (e.g., any of the UEs 130, 150, and 154 sending a request to the network server 116 to retrieve the content package 160 from the CDS 110). Instead of delivering the content package 160 to a UE in its initial state (i.e., in the state in which the CGUE 114 uploaded the content package 160 to the CDS 110), the network server 116 can perform operations so as to enable feedback from a user.

In various embodiments, the network server 116 can retrieve the content package 160 from the CDS 110 and extract the video content 161. The content package 160 can be in its initial state when retrieved from the CDS 110. The network server 116 can execute the segmentation engine 120 that can configure the processor 118 to splice the video content 161 into a plurality of content segments 162. Each of the content segments 162 can be a specific segment or portion of video content that has a starting time and ending time, each of which are indicated by a boundary time marker 162A. For example, the segmentation engine 120 can assign one or more boundary time marker 162A to each of the content segments 162. As such, the segmentation engine 120 can assign one instance of a boundary time marker 162A to each of the plurality of content segments 162 of the video content 161 such that the video content 161 is assigned a plurality of time markers. Each boundary time marker 162A can identify a time value that can correspond with the presentation of the video content being shown during a content segment 162. In some embodiments, the boundary time marker 162A can indicate a time value in hours, minutes, and/or seconds (e.g., content segment start time: 1 hr:04 min:33 seconds, content segment end time: 1 hr:07 min:52 seconds). In some embodiments, each of the content segments 162 can correspond with a different topic, chapter, style, plot, or other portion of the video content 161. The content segments 162 can be (a) uniform in length, and therefore each of the boundary time markers 162A may be (non)uniformly spaced across a timeline of the video content 161.

The segmentation engine 120 also can create a segmentation overlay field 163 for each of the plurality of content segments 162 of the video content 161 such that a plurality of segment overlay fields 163 are created for the video content 161. The segmentation engine 120 can overlay an instance of the segmentation overlay field 163 onto the video content 161 such that the segmentation overlay field 163 can be presented within a content segment 162 on a UE during video playback that occurs between the boundary time markers 162A for the content segment 162. The segmentation overlay field 163 can be a graphical interface that can be displayed while one of the content segments 162 is being executed by a content player for playback and viewing on a UE (e.g., execution by the content player 137 for playback and viewing on the user interface 135 of the UE 130). Each segmentation overlay field 163 can present one or more client generated metric options 164 and/or a client context field 165. The segmentation overlay field 163 can enable user feedback by allowing a user to input a metric that rates or otherwise provides information as to how the user enjoys or otherwise feels about the particular content segment at the particular boundary time marker 162A of the video content 161. To obtain the feedback, the segmentation engine 120 can configure the segmentation overlay field 163 to provide one or more client generated metric options 164 that correspond to the boundary time marker 162A for the particular content segment 162. The client generated metric options 164 can be configured as user interface buttons that are configured to be selected via user input from a user interface, such as the user interface 135 of the UE 130. The client generated metric options 164 can correspond with pre-configured feedback options that can include, but should not be limited to, a "thumbs up," a "thumbs down," a numerical rating (e.g., between 0 to 10), descriptor word(s) (e.g., "hilarious," "boring," "amazing," "more of this please," "awful," etc.), and/or any other metric. Each of the client generated metric options 164 can have a pre-configured value that corresponds with a client generated metric. For example, a user can select one of the client generated metric options 164, and in response to the selection, the value corresponding to the client generated metric option 164 can be assigned to a client generated metric 144 that can be included in a segmented content response, which will be discussed below in further detail. In some embodiments, a user can modify and/or update the types of pre-configured feedback options corresponding to the client generated metric options 164, thereby allowing the user to define the subjective characteristics that should be associated with feedback, while still retaining the input rating mechanism provided by the client generated metric options 164 of the segment overlay field 163. It should be understood that the examples provided are for illustration purposes only, and therefore should not be construed as limiting in any way.

In some embodiments, the segmentation engine 120 can create one or more instances of a client context field 165 that can be associated with one or more of content segments 162, the boundary time markers 162A, and/or the segment overlay fields 163. The client context field 165 can be configured to receive characters, strings, values, and combinations thereof from a user via input on a user interface of a UE (e.g., a client context field string 146 that was input via the user interface 135 of the UE 130). The client context field 165 can allow a user to provide feedback in addition to the client generated metric options 164. For example, the client context field 165 can be selected by a user and allow the user to input comments (e.g., in the form of words and/or sentences via touch input and/or voice input) associated with the particular boundary time markers 162A for the content segment 162 of the video content 161 that is currently being played and viewed on the user interface of the UE (e.g., the user interface 135 of the UE 130). In some embodiments, the segmentation engine 120 can configure the content package 160 to instruct a content player (e.g., the content player 137) to display the segment overlay field 163 on the user interface of the UE (e.g., the user interface 135 of the UE 130), where the segmentation overlay field 163 can present the client generated metric options 164 and/or the client context field 165. In some embodiments, the segment overlay field 163, the client generated metric options 164, and/or the client context field 165 may be presented on a user interface in response to a user input, such as via an on-screen menu. It should be understood that the examples provided are for illustration purposes only, and therefore should not be construed as limiting in any way.

In some embodiments, the segmentation engine 120 can configure and transform the content package 160 so as to instruct a UE (e.g., any of the UEs 130, 150, 154) to create a segmented content response in response to the UE receiving user input associated with the video content 161. For example, when the UE 130 receives the content package 160 from the network server 116, the content player 137 can execute and display the video content 161, along with the segment overlay field 163 at a boundary time marker 162A, where the segment overlay field 163 can present the client generated metric options 164 and/or the client context field 165 that each can provide feedback about a specific portion of the video content 161. In response to the user 148 selecting or otherwise providing input (e.g., via the user interface 135 of the UE 130) corresponding to one of the client generated metric options 164, the UE 130 can generate a segmented content response 140 that includes the client generated metric 144 corresponding to the client generated metric option 164 that was selected. In some embodiments, the client generated metric 144 can provide a value (e.g., 0-100) corresponding to the client generated metric option 164 that was selected. The value associated with the client generated metric 144 can be used for analysis (e.g., for rankings) by the network server 116. In some embodiments, in response to the user 148 providing input to the client context field 165 (e.g., speaking and/or typing words and/or sentences via touch input and/or voice input to the user interface 135 of the UE 130), the UE 130 can create a client context field string 146 based on the user input to the client context field 165. The content package 160 may instruct the content player 137 to include the client context field string 146 in the segmented content response 140. The segmented content response 140 also can include one or more time marker identifiers 142 that can correspond with one or more of the boundary time markers 162A of the content segment 162 for which the feedback (e.g., the client generated metric 144 and/or the client context field string 146) is associated.

In various embodiments, after the content package 160 has been configured or otherwise transformed to enable user feedback (e.g., via the content segments 162, the segment overlay fields 163, the client generated metric options 164 and/or the client context field 165), the network server 116 can send or otherwise provide the content package 160 to one or more UEs (e.g., any of the UEs 130, 150, and/or 154). In an embodiment, when the content package 160 is in its initial state (i.e., as uploaded to the CDS 110 from the CGUE 114), the content package 160 may be referred to as an "original content package," and in response to the content package 160 being configured or otherwise transformed by the network server 116 performing one or more operations discussed above (e.g., operations associated with the content segments 162, the boundary time markers 162A, the segment overlay fields 163, the client generated metric options 164, the client context field 165, and/or enable creation of a segmented content response), the content package 160 may be referred to as an "enhanced content package," It should be understood that the examples provided are for illustration purposes only, and therefore should not be construed as limiting in any way.

In various embodiments, each UE can generate and provide a segmented content response to the network server 116 based on the UE presenting the video content 161 and the associated user providing feedback, such as in the form of the client generated metric 144 and/or the client context field string 146. A segmented content response can identify the UE that received the feedback from a user, such as the segmented content response 140 identifying the UE 130, a segmented content response 152 identifying the UE 150, and a segmented content response 156 identifying the UE 154. In response to the user providing feedback for one or more content segments 162 of the video content 161, each of the UEs (e.g., the UEs 130, 150, 154) can send its segmented content response (e.g., any of the segmented content responses 140, 152, 156) to the network server 116. In some embodiments, the segmented content response (e.g., any of the segmented content responses 140, 152, 156) can be addressed and sent to the AAE 121 of the network server 116. It is understood that each of the segmented content responses 140, 152, 156 can include one or more instances of a time marker identifier 142, a client generated metric 144, and a client context field string 146, where each can be based on the input/feedback provided to a user interface according to the particular content segment 162 and video content 161 that was being presented on the user interface of the UE (e.g., the UEs 130, 150, 154). It should be understood that the examples provided are for illustration purposes only, and therefore should not be construed as limiting in any way.

In some embodiments, the AAE 121 can receive one or more segmented content responses from each one or more UEs. For example, the AAE 121 can receive a plurality of segmented content responses 140, 152, and 156 from the UEs 130, 150, and 154, respectively. The AAE 121 can extract and analyze information from the segmented content responses received. For example, the AAE 121 can extract one or more of the time marker identifiers 142, the client generated metric 144, and/or the client context field string 146 from the segmented content response 140. It is understood that the AAE 121 can extract substantially similar information from each of the other plurality of segmented content responses, such as from the segmented content response 152, 156. In various embodiments, the network server 116 can generate and/or store in memory a leaderboard portal 122 that can be accessed by one or more UEs, such as the CGUE 114. In various embodiments, the AAE 121 can use the extracted information from the segmented content responses to perform analytics so as to populate a generated content leaderboard, such as a generated content leaderboard 126. For example, the AAE 121 can aggregate one or more instances of the client generate metric from each of the received segmented content responses (e.g., the client generated metric 144 from the segmented content response 140 and client generated metrics from each of the other segmented content responses 152, 156). In some embodiments, the network server 116 can assemble and store instances of the client generated metric 144 into an aggregated client generated metric set ("ACGMS") 123 and instances of the client context field string 146 into an aggregated client context field string set ("ACCFSS") 124. Each of the ACGMS 123 and the ACCFSS 124 can be associated with a content generation type 125. For example, the content generation type 125 can identify a particular category, style, genre, or other characteristic of the video content 161 and/or one or more content segment 162 within the video content 161. For example, the video content 161 may relate to a surfing documentary, where one of the content segments 162 is associated with the content generation type 125 that identifies a biographical interview, and another one of the content segments 162 is associated with the content generation type 125 that identifies first-person surfing using a helmet-mounted camera. As such, one instance of the ACGMS 123 and the ACCFSS 124 can be associated with one content generation type 125 (e.g., a content generation type that identifies a biographical interview), and another instance of the ACGMS 123 and the ACCFSS 124 can be associated with another content generation type 125 (e.g., another content generation type that identifies a first-person surfing). In some embodiments, each of the instances of video content 161 associated with one of the UGC channel profiles 112 can identify a content type 113, and each content type 113 can have a pointer to one or more instances of a content generation type 125. By this, the client generated metrics of the ACGMS 123 and the client content field strings of the ACCFSS 124 can be linked to one or more UGC channel profiles 112 via a common association with one or more instances of the content generation type 125.

In various embodiments, the network server 116 can provide one or more UEs (e.g., the CGUE 114) with access to the leaderboard portal 122 to view analytics, rankings, and suggestions as to which of the various types of video content should be created by a content generation user (e.g., content generation user 115). In an embodiment, the CGUE 114 that originally generated the content package 160 can log into the leaderboard portal 122 that can be made available as an application and/or web interface on the CGUE 114. In various embodiments, the leaderboard portal 122 can include a generated content leaderboard, such as the generated content leaderboard 126, that provides a visual presentation of a viewership leaderboard 127A and a comment leaderboard 127B. The AAE 121 can assign a ranking (e.g., by points or values) to an instance of the video content 161, one or more content segments 162 of various instances of the video content 161, and/or a UGC channel profile 112. This can allow the CGUE 114 to present the ranking of an instance of the video content 161 and provide suggestions as to the type of video content that should be created. In some embodiments, the viewership leaderboard 127A can indicate identifiers of video content (and/or content segments) that are ranked according to popularity based on viewership (e.g., number of views) corresponding to a type of content (e.g., a type of content indicated by the content type 113 and/or the content generation type 125). In some embodiments, the comment leaderboard 127B can indicate identifiers of video content (and/or content segments) that are ranked according to popularity based on shared terms indicated in the client content field strings of the ACCFSS 124. In some embodiments, the AAE 121 can use the viewership leaderboard 127A and/or the comment leaderboard 127B to generate one or more instances of a dynamic content channel 129. The dynamic content channel 129 can include an aggregation of various video content in their entirety and/or various content segments from instances of video content that are highly ranked (i.e., within a top X percentage, such as within the top 25% ranking, top 100 videos, or other number that can be configured by a user) on one or more of the viewership leaderboard 127A and/or the comment leaderboard 127B. In some embodiments, each instance of video content (and/or content segment) identified and executable for playback within the dynamical content channel 129 can indicate a viewership leaderboard ranking 129A and a comment leaderboard ranking 129B. In some embodiments, the dynamical content channel 129 can indicate a content type 113 and/or a content generation type 125 to allow a user to understand that the dynamic content channel 129 is associated with a certain type of content, such as but not limited to, surfing, knitting, cooking, video games, off-road truck, car reviews, music videos, or any other genre and/or sub-genre thereof depending on the granularity of the content type 113 and/or the content generation type 125 (e.g., a dynamic content channel for off-road vehicles being distinct from a dynamic content channel for off-road vehicles that engage in rock crawling using only a certain make and model). In some embodiments, the AAE 121 can identify the dynamic content channel 129 based on the rankings shown in the viewership leaderboard 127A and/or the comment leaderboard 127B of the generated content leaderboard 126. In some embodiments, the network server 116 can execute the AAE 121 to provide predictive analytics so as to preemptively determine a rating, ranking, and/or other metric of popularity corresponding to content already stored in the CDS 110, new content that is dynamically generated (e.g., via one or more of dynamic content channel 129), and/or portions thereof. In some embodiments, the AAE 121 can include a prediction software module that employs machine learning to analyze and provide predictions to determine which content and/or content type will be popular based on at least one or more of information of the content itself, feedback from a client UE, information associated with a content creator (e.g., the client generation user 115), one or more channels (e.g., one or more UGC channel profiles 112), a combination thereof, or the like. In some embodiments, one or more dynamic content channels 129 can be created based on machine learning and/or predictive analytics corresponding to the likelihood of content being popular. It should be understood that the examples provided are for illustration purposes only, and therefore should not be construed as limiting in any way.

In some embodiments, the AAE 121 can enable one or more content creators (e.g., the client generation user 115) to collaborate so as to facilitate the production and creation of new content. Although only one content generation user is illustrated in FIG. 1, it is understood that the network server 116 can interact with a plurality of content generation users. Therefore, in some embodiments, the network server 116 can identify which content generation users correspond with at least one instance of video content that is included in new content and/or channel created by the network server 116, such as the dynamic content channel 129 created by the network server 116. In some embodiments, the network server can enable one or more content generation users to collaborate on creating offshoots and/or variations of one or more dynamic content channels. In some embodiments, the network server 116 can assign a contribution value to the amount of content that is included in a dynamic content channel 129 and corresponds with a particular content generation user. In some embodiments, a compensation amount can be assigned to the contribution value corresponding to a content generation user. Examples of a compensation amount can include monetary compensation (e.g., real and/or digital currency), special access to features of the leaderboard portal 122, digital advertisements, or the like. It should be understood that the examples provided are for illustration purposes only, and therefore should not be construed as limiting in any way. In some embodiments, the AAE 121 can generate a content creation request 128 that can identify and provide a link to the dynamic content channel 129 for users to watch video content from the dynamic content channel 129. In some embodiments, the content creation request 128 can be sent to one or more UEs that participated in generating instances of video content that is included within the dynamic content channel 129, such as sending the content creation request 128 to the CGUE 114 that generated the content package 160 using the UGC channel profile 112. In some embodiments, the content creation request 128 can prompt a user to participate in generating video content to add to the dynamic content channel 129, such as by providing suggestions of types of video content that other users desire to watch. In some embodiments, the content creation request 128 can direct the content generation user to the leaderboard portal 122 to explore the similarity between video content on various dynamic content channels, such as the dynamic content channel 129, and propose refinements to video content within the dynamic content channel, such as through addition and/or truncation of segments of video content. In some embodiments, the content creation request 128 can include an invitation to collaborate with other content generation users so as to facilitate the growth of one or more dynamic content channels. In some embodiments, the content creation request 128 can be sent to a UE that did not participate in creation of the video content identified in the dynamic content channel 129, such as any of the UEs 130, 150, and/or 154. By this, various users can contribute and instantiate new video content that can be added to the dynamically created channels, such as the dynamic content channel 129, so as to grow various channels in through received metrics and customer feedback. It is understood that the AAE 121 may adjust (e.g., add and/or drop) video content and instances of content segments from the dynamic content channel 129 based on the viewership leaderboard ranking 129A and/or the comment leaderboard ranking 129B corresponding with the instances of video content. It should be understood that the examples provided are for illustration purposes only, and therefore should not be construed as limiting in any way.

FIG. 1 illustrates instances of one the network 102, one network access point 104, one network access point 106, one CDS 110, one UE profile 111, one UGC channel profile 112, one content type 113, one CGUE 114, one content generation user 115, one network server 116, one transceiver 117, one processor 118, one memory 119, one segmentation engine 120, one AAE 121, one leaderboard portal 122, one ACGMS 123, one ACCFSS 124, one content generation type 125, on generated content leaderboard 126, one viewership leaderboard 127A, one comment leaderboard 127B, one dynamic content channel 129, one viewership leaderboard ranking 129A, one comment leaderboard ranking 129B, on UE 130, one processor 132, one transceiver 133, one display 134, one user interface 135, one memory 136, one content player 137, one segmented content response 140, one time marker identifier 142, one client generated metric 144, one client context field string 146, one user 148, one UE 150, one user 151, one segmented content response 152, one UE 154, one user 155, one segmented content response 156, one content package 160, one video content 161, one set of content segments 162, one boundary time marker 162A, one segment overlay field 163, one set of client generated metric options 164, and one client context field 165. It should be understood, however, that some implementations of the operating environment 100 can include zero, one, or more than one instances of these elements of the operating environment 100 shown in FIG. 1. As such, the illustrated embodiment of the operating environment 100 should be understood as being illustrative and should not be construed as being limiting in any way.

Figure 2:
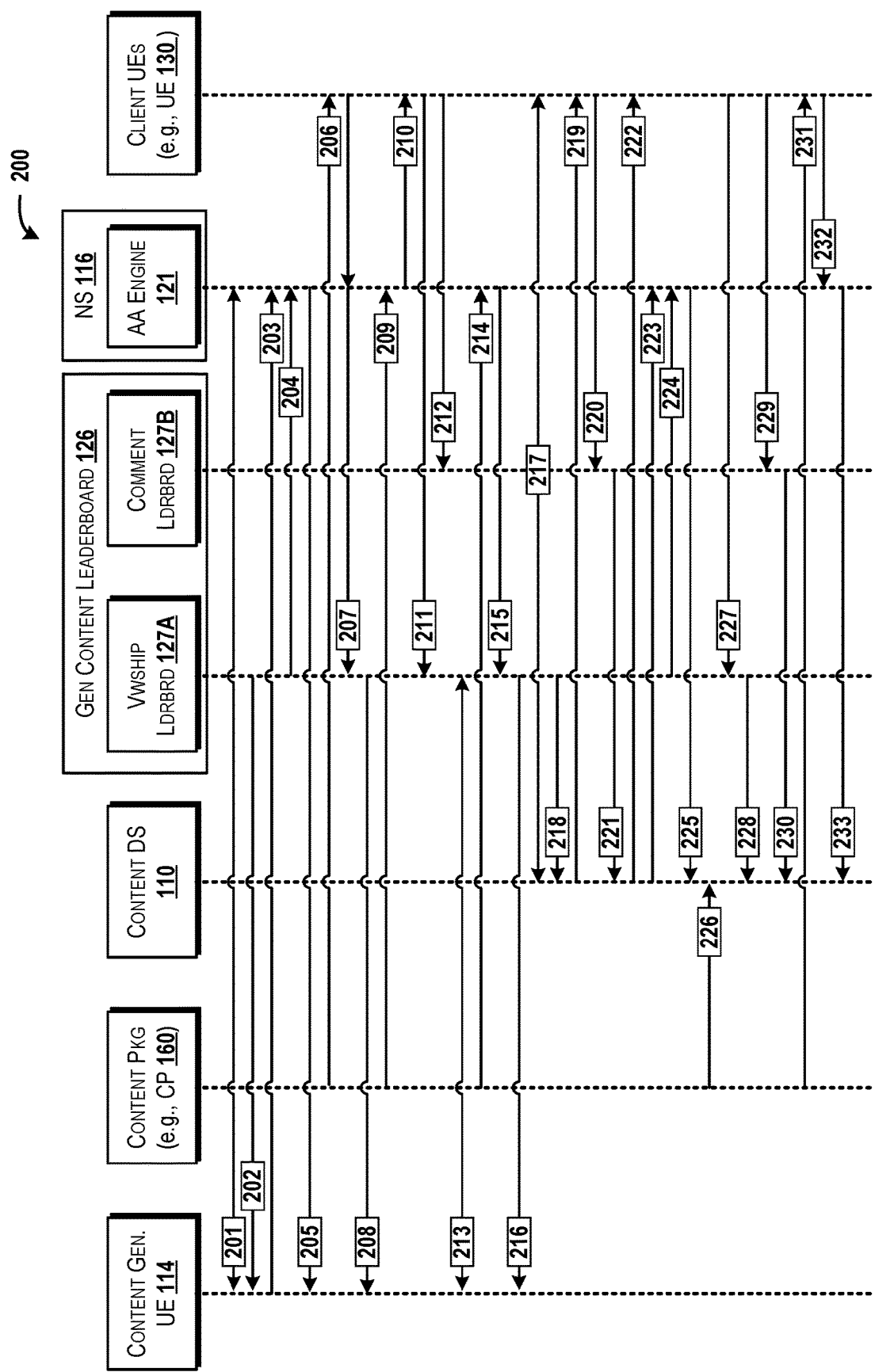
FIG. 2 is a messaging diagram illustrating aspects of a communication flow between system components for network aggregation of streaming data interactions from distinct user interfaces, according to an illustrative embodiment.
Figure 3:
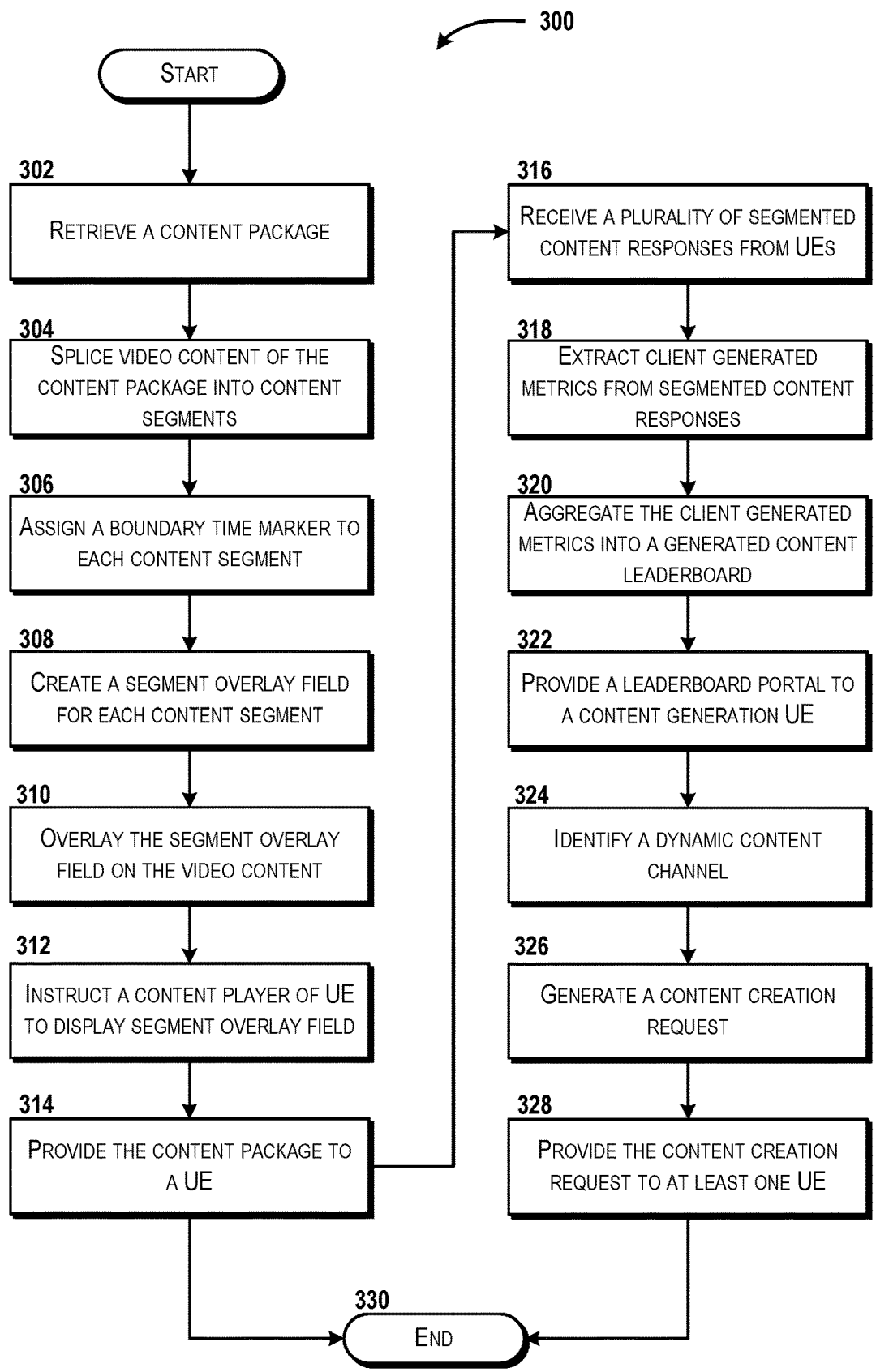
FIG. 3 is a flow diagram illustrating aspects of a method for network aggregation of streaming data interactions from distinct user interfaces, according to an illustrative embodiment.

Turning now to FIGS. 2 and 3, with continued reference to FIG. 1, aspects of a communication flow 200 and a method 300 for embodiments of network aggregation of streaming data interactions from distinct user interactions will be described in detail, according to an illustrative embodiment. It should be understood that each of the operations of the one or more methods disclosed herein (e.g., the communication flow 200 and/or the method 300 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as any component within the network server 116 (e.g., the segmentation engine 120 and/or the AAE 121), the network 102, and/or the UEs 114, 130, 150, and/or 154, to perform one or more operations and/or causing the processor to direct other components of the computing system or device to perform one or more of the operations.

For purposes of illustrating and describing the concepts of the present disclosure, the operations of methods disclosed herein are described as being performed by at least the network server 116 via execution of one or more software modules (i.e., where software modules refers to computer-executable instructions configured as data that can instruct and transform a processor) such as, for example without limitation, the segmentation engine 120 and the AAE 121 that configure one or more processor 118 of the network server 116. It should be understood that additional and/or alternative devices and/or network elements can, in some embodiments, provide the functionality described herein via execution of one or more modules, applications, and/or other software including, but not limited to, the other instances of a content player 137 on a UE (e.g., any of the UEs 114, 130, 150, 154) and/or other content made available by the network server 116 (e.g., the leaderboard portal 122). Thus, the illustrated embodiments are illustrative, and should not be viewed as being limiting in any way. The communication flow 200 and the method 300 will be described with reference to one or more of the FIGS. 1, 2, and 3.

Turning now to FIG. 2, the communication flow 200 for network aggregation of streaming data interactions from distinct user interfaces is provided, according to an embodiment. The communication flow 200 can begin with messages 201-205, where a content producer, such as the content generation user 115, may seek to use a network service of the network server 116 to guide decisions for generating new video content and generating dynamic content channels, such as through the use of enabling feedback of users who view the video content (i.e., "viewers"). For example, the content generation user 115 can instruct their CGUE 114 to send a message 201 to the AAE 121 that can execute on the network server 116, where the message can request to access the leaderboard portal 122 and view the generated content leaderboard 126. In some embodiments, the AAE 121 can analyze one or more instances of video content produced by the content generation user 115 (and/or any other user) and corresponding to a content generation type 125 so as to update the viewership leaderboard 127A and/or the comment leaderboard 127B. In an embodiment, the network server 116 can send a message 202 to the CGUE 114 to grant the CGUE 114 access to the generated content leaderboard 126 and any information therein, such as the viewership leaderboard 127A. The content generation user 115 can explore the viewership leaderboard to discover popular topics and identify various types of video content that may be interesting to a target audience. In some embodiments, the CGUE 114 can send a message 203 to the AAE 121 that requests access to rankings and other information within the generated content leaderboard 126. In some embodiments, the content generation user 115 can use the CGUE 114 to scan the viewership leaderboard 127A for a hierarchy of topics that can be sorted by popularity. The viewership leaderboard 127A can enable exploration of channels that are associated with underserved topics (i.e., content topics for which the amount of video content for channels is below average in the CDS 110), exploration of content on channels that have high viewership, and exploration of video content on channels that have above-average user comments (e.g., through instances of the client context field string 146), thereby indicating higher social activity. The AAE 121 can retrieve the information being requested by the CGUE 114 from the viewership leaderboard 127A in a message 204. The AAE 121 of the network server 116 can assess the information from the viewership leaderboard 127 (and/or any other information from the generated content leaderboard 126) and identify portions of video content (e.g., boundary time markers and/or identifiers of content segments associated with an instance of video content) that allows the content generation user 115 to understand the type of video content that can be curated by the network server 116. The AAE 121 can relay this information to the CGUE 114 in a message 205. It should be understood that the examples provided are for illustration purposes only, and therefore should not be construed as limiting in any way.

In some embodiments, the communication flow can also include messages 206-212, which can facilitate a content creation and analysis process that can promote interactions with users who view the video content, such as any of the users 148, 151, and 155. In an embodiment, the network server 116 can configure the content package 160 that was generated by the CGUE 114 to enable user feedback, such as though the use of splicing the video content 161 into the content segments 162 and providing segment overlay fields 163 that provide the client generated metric options 164 and/or the client context field 165. After the network server 116 transforms the content package 160 from its initial state, the content package 160 can be sent to one or more client UEs (e.g., any of the UEs 130, 150, and/or 154) in a message 206 for viewing and feedback. In some embodiments, one or more of the client UEs (e.g., any of the UEs 130, 150, and/or 154) can provide feedback via a segmented content response (e.g., any of the segmented content responses 140, 152, and/or 156) that can be sent to the network server 116, where the network server 116 can extract and use the information to update the generated content leaderboard 126 in a message 207. A message 208 can be sent to the CGUE 114 that allows the content generation user 115 to view feedback and explore the viewership leaderboard 127A. The feedback from users of the video content 161 may enable the content generation user 115 to evaluate which viewers are likely to watch additional content, thereby aiding the content generation user in producing new content. In some embodiments, the network server 116 can create a content trailer and/or clips of content to test how new viewers would respond to the video content. For example, the content package 160 can be sent to the network server 116 in a message 209, and the network server 116 can prepare a content trailer using one or more content segments 162 of the video content 161 from the content package 160. The network server 116 can send a message 210 to one or more client UEs that have not yet viewed the video content 161 (e.g., any of the UEs 130, 150, and/or 154). In an embodiment, users that viewed the content trailer can provide feedback, such as through suggestions, ideas, and/or descriptions of possible modifications and/or alterations to the content associated with the video content 161 that was shown in the content trailer. In an embodiment, the feedback from the users of one or more UEs that viewed the content trailer (e.g., any of the UEs 130, 150, and/or 154) can provide feedback in a message 211 that is used to update the viewership leaderboard 127A and in a message 212 that is used to update the comment leaderboard 127B.

In some embodiments, the communication flow 200 can continue with messages 213-216. In some embodiments, the network server 116 can assist a content generation user in analyzing the potential market for content viewership. In an embodiment, the CGUE 114 can access the viewership leaderboard 127A via a message 213, which can enable the content generation user 115 to view suggestions for creating additional video content based on one or more of demographics, region, viewer characteristics, content topics, or the like. In an embodiment, the inspection of various data provided by the viewership leaderboard 127A may be restricted such that the content generation user 115 is allowed to view viewership information pertaining only to the users who viewed the video content 161 and participated in providing feedback. It should be understood that the examples provided are for illustration purposes only, and therefore should not be construed as limiting in any way. In an embodiment, the network server 116 can analyze and assess one or more content segments 162 of the video content 161. For example, the network server 116 can receive the content package 160 in a message 214. The network server 116 can analyze one or more content segments 162 of the video content 161 based on user feedback and update the viewership leaderboard 127A in a message 215, where the viewership leaderboard 127A can indicate the content segments 162 that were popular within the video content 161 of the content package 160. A message 216 can be sent to the CGUE 114 that alerts the content generation user 115 of updates to the viewership leaderboard 127A. It should be understood that the examples provided are for illustration purposes only, and therefore should not be construed as limiting in any way.

In some embodiments, the communication flow 200 can continue with messages 217-226. In some embodiments, channels can be created dynamically based on content generated by one or more users and/or viewership associations between content that already exists within the CDS 110. In some embodiments, the network server 116 can monitor requests for video content from the CDS 110, such as one or more messages 217 that request content from the CDS 110. In some embodiments, the network server 116 can identify channels that provide video content to specific target demographics (e.g., early teens, people who enjoy sports, etc.) and may monitor whether certain channels experience surges in popularity based on trending topics, such as a new music artist or type of nature video. In some embodiments, the network server 116 can create a dynamic content channel, such as the dynamic content channel 129, that can include a plurality of video content that is pulled from multiple content packages associated with one or more UGC channel profiles 112 (also referred to as "channels") that in turn correspond with content generation users (e.g., the content generation user 115). In an embodiment, an identifier of the viewership leaderboard 127A can be provided to the CDS 110 in a message 218 to indicate which video content is listed within a dynamic content channel. In some embodiments, the dynamic content channel 129 can be created based on feedback from users, such as based on the ACGMS 123 and/or the ACCFSS 124. In some embodiments, the network server 116 can identify possible users (e.g., based on one or more UE profiles 111 of a user) who may enjoy video content that is assembled and available within the dynamic content channel 129. In some embodiments, the dynamic content channel 129 can be stored within the CDS 110. In an embodiment, the dynamic content channel 129 can be accessible to one or more users via a message 219 that allows a client UE (e.g., any of the UEs 130, 150, and/or 154) to provide feedback about the dynamic content channel 129. In some embodiments, one or more client UEs (e.g., any of the UEs 130, 150, and/or 154) can provide a message 220 that includes comments and/or feedback to the comment leaderboard 127B. In some embodiments, the comments and/or feedback can be saved in the CDS 110 via a message 221. In some embodiments, one or more instances of video content from the CDS 110 can be provided to a client UE (e.g., any of the UEs 130, 150, and/or 154) via a message 222 based on previous feedback provided by a user. In some embodiments, one or more instances of video content can be sent from the CDS 110 to the network server 116 via a message 223, where the network server can analyze forum and/or social media websites to determine whether the video content is popular among users. In some embodiments, information from the viewership leaderboard 127A can be provided to the network server 116 in a message 224, where the network server 116 can analyze whether users find the video content to be unique and/or novel based on certain visual tags and/or audio tags that are discussed across a forum and/or website. In some embodiments, the network server 116 can send a message 225 to the CDS 110 to store information (e.g., metrics) determined from the user feedback. In some embodiments, a message 226 can be sent to the CDS 110 that indicates one or more attributes about the content package 160 in relation to the user feedback, such as indicating that one or more content segments 162 of the video content 161 of the content package 160 pertains to a content topic (e.g., a body cam or drone footage related to an outdoor activity) that may have been referenced by the user feedback. It should be understood that the examples provided are for illustration purposes only, and therefore should not be construed as limiting in any way.

In some embodiments, the communication flow can continue with messages 227-233 that can enable one or more users to alter and/or permute one or more dynamic content channel 129. In some embodiments, a UE (e.g., any of the UEs 130, 150, and/or 154) can access the viewership leaderboard 127A via a message 227. In some embodiments, the message 227 can include one or more suggestions that can alter one or more attributes of a dynamic content channel listed on the viewership leaderboard 127A, such as but not limited to, the name of the dynamic content channel 129, a video content time limit, a content generation type that is allowed to be shown on the dynamic content channel 129 (e.g., barbeque food and cooking shows), or the like. In some embodiments, the updated attributes for the dynamic content channel 129 can be sent to the CDS 110 in a message 228. In some embodiments, one or more users of a UE (e.g., any of the UEs 130, 150, and/or 154) can send a message 229 to view and/or provide comments to the comment leaderboard 127B. In some embodiments, the message 229 can request that the dynamic content channel 129 shift the type of video content that is presented on the dynamic content channel 129 (e.g., a request for a dynamic content channel for children to shift from showing unicorn cartoons to showing a superhero puppy cartoon). In some embodiments, the suggestions from the user can be saved in the CDS 110 via a message 230. In some embodiments, the network server 116 can retain the dynamic content channel 129 that has a first content generation topic (e.g., unicorn cartoons) and create another dynamic content channel that is populated with a second content generation topic (e.g., superhero puppy cartoons). In an embodiment, one or more instances of the video content that aligns with the second content generation topic can be sent to a client UE (e.g., any of the UEs 130, 150, and/or 154) via a message 231. In some embodiments, one or more users may formulate associations between one or more instances of video content across different channels. In some embodiments, the users may provide feedback about these associations to the network server 116 via a message 232. In some embodiments, the network server 116 can update and/or alter one or more dynamic content channels (e.g., the dynamic content channel 129) with one or more instances of video content based on the user feedback pertaining to the video content associations. In some embodiments, the network server 116 can save the updated list of video content for the dynamic content channel to the CDS 110 via a message 233. It should be understood that the examples provided are for illustration purposes only, and therefore should not be construed as limiting in any way. In some embodiments, the communication flow 200 can end at message 233.

Turning now to FIG. 3, the method 300 for network aggregation of streaming data interactions from distinct user interfaces is disclosed, according to an embodiment. It should be understood that the examples provided are for illustration purposes only, and therefore should not be construed as limiting in any way. In some embodiments, the method 300 can begin at operation 302, where the network server 116 can retrieve the content package 160 from the CDS 110. The content package 160 can be in an initial state when retrieved from the CDS 110. In some embodiments, the content package 160 can be retrieved in response to receiving one or more video content request corresponding to the content package 160, where the video content request can be received by the network server 116 from one or more UEs (e.g., any of the UEs 130, 150, 154). From operation 302, the method 300 can proceed to operation 304, where the network server 116 can execute the segmentation engine 120 to splice the video content 161 of the content package 160 into a plurality of content segments, such as the content segments 162. In some embodiments, the video content 161 may be spliced into the plurality of content segments 162 based on one or more input (e.g., one or more indications of a time value corresponding to a chapter or scene of the video content) from a content generation user equipment that generated the content package 160 in its initial state (e.g., the CGUE 114). From operation 304, the method 300 can proceed to operation 306, where the network server 116 can assign a boundary time marker 162A to each of the plurality of content segments 162 of the video content 161 such that the video content 161 is assigned a plurality of boundary time markers 162A. Each of the content segments 162 can be (non)uniform in time span, and thus the boundary time markers 162A may or may not be equally spaced.

From operation 306, the method 300 can proceed to operation 308, where the network server 116 can create a segment overlay field 163 for each of the plurality of content segments 162 of the video content 161 such that a plurality of segment overlay fields are created for the video content 161. Each segment overlay field 163 can be configured to receive input that corresponds with at least one of the client generated metrics options 164 that correspond with the boundary time marker 162A for the particular content segment 162. For example, when the user 148 provides input by selection of one of the client generated metric options 164 via the user interface 135 of the UE 130, the content player 137 can interpret the input as the client generated metric 144 that is received by the segment overlay field 163. From operation 308, the method 300 can proceed to operation 310, where the network server 116 can overlay each segment overlay field 163 (and thus a plurality of segment overlay fields) onto the video content 161 based on the content segment 162 that each segment overlay field 163 is associated. Put differently, each content segment 162 of video content 161 can be overlaid with a segment overlay field 163 that can display one or more client generated metric options 164 so that when a user (e.g., any of users 148, 151, 155) provides input to a UE (e.g., any of the UEs 130, 150, 154), the content player 137 generates a client generated metric 144 corresponding to the option that is selected from among the client generated metric options 164, thereby allowing for feedback at a particular time of video content 161.

From operation 310, the method 300 can proceed to operation 312, where the network server 116 can configure the content package 160 to instruct a content player (e.g., the content player 137) of a UE (e.g., any of the UEs 130, 150, 154) to display, on the user interface of each UE, one of the plurality of segment overlay fields 163 at (and/or during the video content presentation between) the boundary time markers 162A. From operation 312, the method 300 can proceed to operation 314, where the network server 116 can provide the content package 160 to one or more user equipment (e.g., any of the UEs 130, 150, 154). In various embodiments, the content package 160 may be provided to one or more UE after the network server 116 performs one or more operations (e.g., one or more of the operations 304-308) to the video content 161 of the content package 160 so as to allow for client generated metrics and other feedback to be received from a viewing user. In some embodiments, from operation 314, the method 300 can proceed to operation 330, where the method 300 can end.

In some embodiments, from operation 314, the method 300 can proceed to operation 316, where the network server 116 can receive one or more segmented content responses from the one or more user equipment, such as the segmented content responses 140, 152, and/or 156 that may be sent to the network server 116 from the UEs 130, 150, and 154, respectively. The segmented content responses can include one or more of the client generated metric 144 that was received by the content player 137 via user input, one or more time marker identifiers 142 corresponding to the client generated metric 144, and/or the client context field string 146. From operation 316, the method 300 can proceed to operation 318, where the network server 116 can extract at least one client generated metric 144 from each of segmented content response that is received, such as the segmented content responses 140, 152, and/or 156. In some embodiments, a segmented content response (e.g., any of the segmented content responses 140, 152, 156) may include one or more instances of a time marker identifier 142 that points to or is otherwise associated with the client generated metric corresponding to a specific content segment 162 of the video content 161. In some embodiments, a segmented content response (e.g., the segmented content response 140) can include the client context field string 146 that can provide a character string that can be analyzed by the network server 116 and interpreted as feedback from a user about the specific content segment 162. From operation 318, the method 300 can proceed to operation 320, where the network server 116 can aggregate the client generated metrics 144 from each segmented content response into the ACGMS 123 that can form a basis to populate the generated content leaderboard 126. From operation 320, the method 300 can proceed to operation 322, where the network server 116 can provide the CGUE 114 with access to the leaderboard portal 122, where the CGUE 114 is associated with the content package 160 that can be included among the viewership leaderboard 127A and/or the comment leaderboard 127B of the generated content leaderboard 126. From operation 322, the method 300 can proceed to operation 324, where the network server 116 can identify the dynamic content channel 129 based on the information in the generated content leaderboard 126 so as to inform at least one of a plurality of UEs, such as any of the UEs 130, 150, and/or 154. From operation 324, the method 300 can proceed to operation 326, where the network server 116 can generate the content creation request 128 for one or more UEs, such as any of the UEs 130, 150, 154 and/or the CGUE 114. In some embodiments, the content creation request 128 can indicate the dynamic content channel 129 that was identified by the network server 116 due to the dynamic content channel 129 being of relevant interest to a UE associated with one or more of the UE profiles 111 and/or the UGC channel profiles 112. From operation 326, the method 300 can proceed to operation 328, where the network server 116 can provide one or more instances of the content creation request 128 to at least one UE, such as any of the UEs 130, 150, 154 and/or the CGUE 114. In some embodiments, from operation 328, the method 300 can proceed to operation 330, where the method 300 can end.

Figure 4:
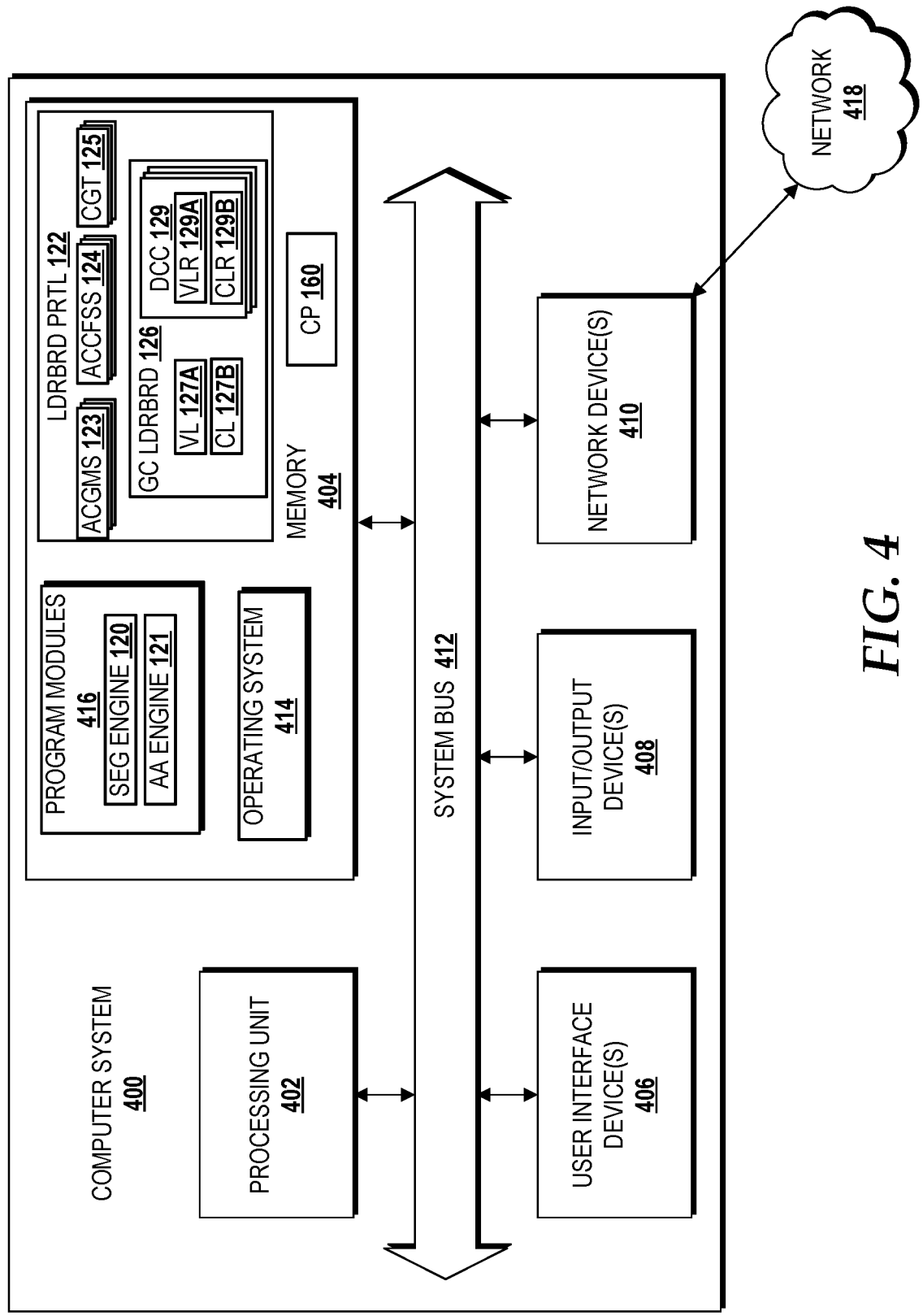
FIG. 4 is a block diagram illustrating an example computer system capable of implementing aspects of the embodiments presented and described herein.

Turning now to FIG. 4, a block diagram is provided illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the network server 116 and/or the CDS 110 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can include one or more central processing units ("CPUs") configured with one or more processing cores, and/or one or more graphics processing unit ("GPU") configured to accelerate operations performed by one or more CPUs. The processing unit 402 can include one or more system-on-chip ("SoC") components along with one or more other components, including, for example, one or more of the memory resources, and/or one or more of the other resources. Processing units are generally known, and therefore are not described in further detail herein. It is understood that the processor 118 of the network server 116 can be implemented as one or more processing unit 402.

The memory 404 communicates with the processing unit 402 via the system bus 412. In various embodiments, the memory 119 of the network server 116 can be implemented as the memory 404. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the segmentation engine 120, the AAE 121, and/or other program modules. According to some embodiments, the program modules 416 may be embodied in hardware, software, firmware, or any combination thereof. These and/or other programs can be embodied in computer-readable medium including instructions that, when executed by the processing unit 402, in some embodiments, may perform and/or facilitate performance of one or more of the operations discussed with respect to FIGS. 1, 2, and 3, described in detail above. In some embodiments, the memory 404 also can be configured to store information of the CDS 110, such as but not limited to the UE profiles 111, the UGC channel profiles 112, and/or one or more instances of the content package 160 and information therein, such as the video content 161, the content segments 162, the boundary time markers 162A, the segment overlay fields 163, the client generated metric options 164, the client context field 165, combinations thereof, or any other data. In some embodiments, the memory 404 also can be configured to store the leaderboard portal 122, the ACGMS 123, the ACCFSS 124, the suggested content generation types 125, the generated content leaderboard 126, the viewership leaderboard 127A, the comment leaderboard 127B, the dynamic content channels 129, the viewership leaderboard ranking 129A, the comment leaderboard ranking 129B, one or more of the content creation requests 128, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 102 and/or the network 600. Examples of the network devices 410 include, but are not limited to, a modem, a radio frequency ("RF") or infrared ("IR") transceiver, a telephonic interface, a bridge, a router, or a network card. The network devices 410 may support communication and functionality with the network 418, such as via physical network functions, virtual network functions, virtual and/or physical edge devices, or the like. The network device(s) 410 can, in some embodiments, include one or more transceivers and/or network interfaces of the network server 116 discussed with respect to FIG. 1. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 418 may be or may include a wired network such as, but not limited to, a Wide Area Network ("WAN"), a wired Personal Area Network ("PAN"), a wired Metropolitan Area Network ("MAN"), an optical network, a VoIP network, an IP/MPLS network, a PSTN network, an IMS network, an EPC network, or any other mobile network and/or wireline network.

Figure 5:
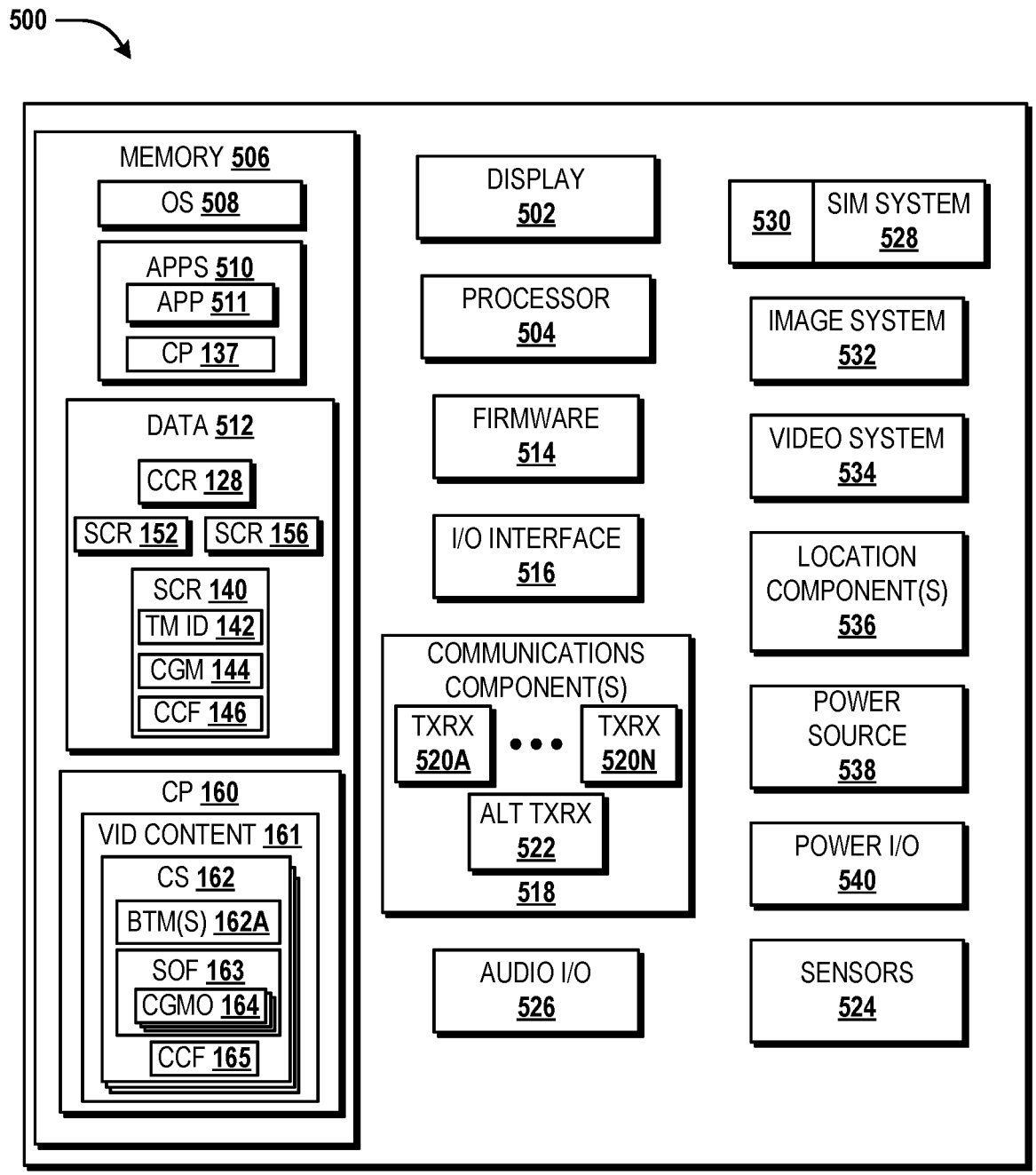
FIG. 5 is a diagram illustrating an example user equipment capable of implementing aspects of the concepts and technologies described herein according to embodiments of the present disclosure.

Turning now to FIG. 5, an illustrative mobile device 500 and components thereof will be described. In some embodiments, one or more of the UEs 114, 130, 150, and 154 (shown in FIG. 1) can be configured like the mobile device 500. It should be understood that the examples provided are for illustration purposes only, and therefore should not be construed as limiting in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5). In some embodiments, the application 510 can include a browser or other application that can interact with and receive content for playback. In some embodiments, the content player 137 can be included as an application and/or stored in the memory 506 for execution by the mobile device 500.

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing content provided across the network 102, entering/deleting data, entering and setting local credentials (e.g., user IDs and passwords) for device access, configuring settings, manipulating address book content and/or settings, multimode interaction, interacting with other applications 510 (e.g., a video playback application 511 and/or the content player 137), and otherwise facilitating user interaction with the operating system 508, the applications 510, and/or other types or instances of data 512 that can be stored at the mobile device 500. The data 512 can include, for example, one or more identifiers and/or data packages, and/or other applications or program modules. In some embodiments, the data 512 can include one or more of the content creation request 128, the segmented content responses 140, 152, and 156, the content package 160 and information there (e.g., the video content 161, the content segments 162, the boundary time markers 162A, the segment overlay fields 163, the client generated metric options 164, the client context field 165) and/or other data sent among and/or between the UEs 114, 130, 150, 154 and the network server 116. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE") in licensed spectrum and unlicensed spectrum, and various other 2G, 2.5G, 3G, 4G, 5G and greater generation technology standards (e.g., a new radio standard). Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
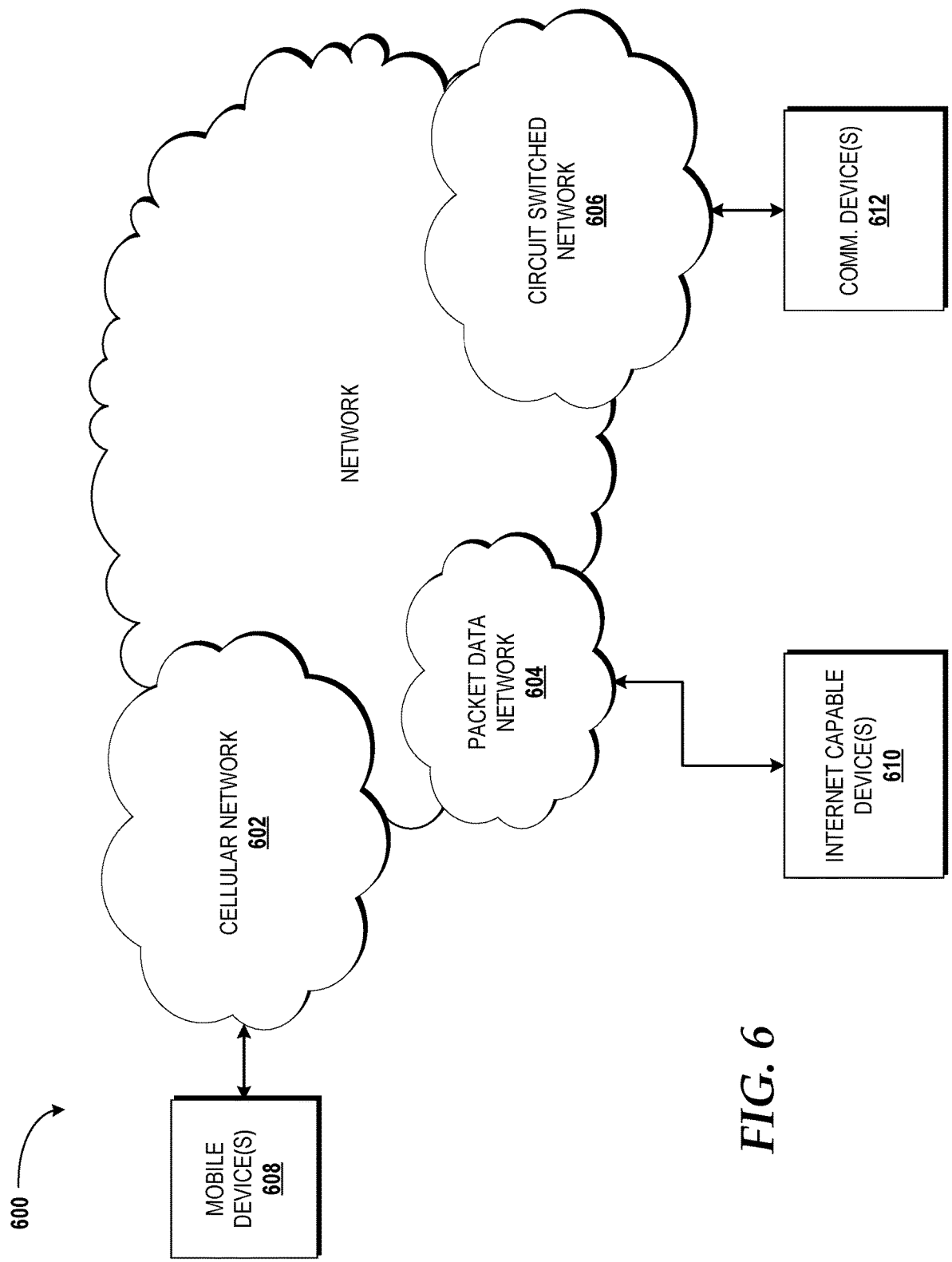
FIG. 6 is a diagram illustrating an example network capable of implementing aspects of the embodiments discussed herein.

Turning now to FIG. 6, details of a network 600 are illustrated, according to an illustrative embodiment. In some embodiments, one or more of the network 102 and/or the network 418 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, the network 102 of FIG. 1 can operate, at least in part, as the packet data network 604 and/or as or in cooperation with the cellular network 602.

The mobile communications device 608, such as, for example, a cellular telephone, a mobile terminal, a PDA, a laptop computer, a handheld computer, and combinations thereof, can be operatively connected to the cellular network 602. In some embodiments, the UEs 130, 150, 154 can be configured as the mobile communications device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G and 5G mobile communications standards such as LTE, or the like, as well as evolved and future mobile standards, including but not limited to LTE-Advanced, LTE-Advanced Pro and 5G.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (e.g., a "browser") for executing a web page in a format readable by the browser or other software such as executable applications. Other files and/or data may be accessible via "links" in the retrieved files, as is generally known. In some embodiments, the packet data network 604 includes or is in communication with the Internet. In some embodiments, the at least some of the network 102 can be configured as a packet data network, such as the packet data network 604. The circuit switched network 606 includes various hardware and software for providing circuit switched communications. The circuit switched network 606 may include, or may be, what is often referred to as a POTS. In some embodiments, the at least some of the network 102 also can be configured as a circuit switched network, such as the circuit switched network 606. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. In some embodiments, the internet-capable devices 610 can include one or more of the UEs 114, 130, 150, 154. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the network 102 and/or the network server 116 can be performed by the cellular network 602, the packet data network 604, and/or the circuit switched network 606, alone or in combination with other networks, network elements, and the like, according at least to aspects of the features and operations discussed herein.

Based on the foregoing, it should be appreciated that concepts and technologies directed to network aggregation of streaming data interactions from distinct user interfaces have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, in response to execution by the processor, cause the processor to perform operations comprising:
retrieving a content package comprising video content from a content data store, wherein the content package is in an initial state when retrieved from the content data store,
splicing the video content from the content package into a plurality of content segments that are configured for playback via a user interface,
assigning at least one boundary time marker to each of the plurality of content segments such that the video content is assigned a plurality of boundary time markers,
creating a segment overlay field for each of the plurality of content segments such that a plurality of segment overlay fields are created for the video content, wherein each segment overlay field is configured to receive a client generated metric corresponding to the boundary time marker for each of the plurality of content segments,
overlaying an instance of the segment overlay field onto a content segment of the plurality of content segments such that the instance of the segment overlay field is presented within the content segment on a user equipment during playback of the content segment that occurs between a boundary time marker indicating a start time of the content segment and a boundary time marker indicating an end time of the content segment, wherein the content package is transformed from the initial state so as to include at least the instance of the segment overlay field of the plurality of segment overlay fields,
providing the content package to a plurality of user equipment including the user equipment,
receiving a plurality of segmented content responses from the plurality of user equipment,
extracting client generated metrics from the plurality of segmented content responses,
aggregating the client generated metrics into a generated content leaderboard, wherein the generated content leaderboard provides suggestions as to content that should be created, and
generating, based at least in part on the generated content leaderboard, a dynamic content channel comprising an aggregation of various video content comprising at least one of the plurality of content segments.

2. The system of claim 1, wherein the operations further comprise configuring the content package to instruct a content player of each of the plurality of user equipment to display an instance of the segment overlay field during playback of the content segment.

3. The system of claim 1, wherein the operations further comprise providing a leaderboard portal to a content generation user equipment associated with the content package, wherein the content generation user equipment initially uploads the content package to the content data store.

4. The system of claim 1, wherein the operations further comprise identifying the dynamic content channel for at least one of the plurality of user equipment based on the generated content leaderboard.

5. The system of claim 4, wherein the operations further comprise generating a content creation request for the at least one of the plurality of user equipment, wherein the content creation request identifies the dynamic content channel.

6. A method comprising:
  retrieving, by a processor executing on a network server, a content package comprising video content from a content data store, wherein the content package is in an initial state when retrieved from the content data store;
  splicing, by the processor executing on the network server, the video content from the content package into a plurality of content segments that are configured for playback via a user interface;
  assigning, by the processor executing on the network server, at least one boundary time marker to each of the plurality of content segments such that the video content is assigned a plurality of boundary time markers;
  creating, by the processor executing on the network server, a segment overlay field for each of the plurality of content segments such that a plurality of segment overlay fields are created for the video content, wherein each segment overlay field is configured to receive a client generated metric corresponding to the boundary time marker for each of the plurality of content segments;
  overlaying, by the processor executing on the network server, an instance of the segment overlay field onto a content segment of the plurality of content segments such that the instance of the segment overlay field is presented within the content segment on a user equipment during playback of the content segment that occurs between a boundary time marker indicating a start time of the content segment and a boundary time marker indicating an end time of the content segment, wherein the content package is transformed from the initial state so as to include at least the instance of the segment overlay field of the plurality of segment overlay fields;
  providing, by the processor executing on the network server, the content package to a plurality of user equipment including the user equipment;
  receiving, by the processor executing on the network server, a plurality of segmented content responses from the plurality of user equipment;
  extracting, by the processor executing on the network server, client generated metrics from the plurality of segmented content responses;
  aggregating, by the processor executing on the network server, the client generated metrics into a generated content leaderboard, wherein the generated content leaderboard provides suggestions as to content that should be created; and
  generating, by the processor executing on the network server, based at least in part on the generated content leaderboard, a dynamic content channel comprising an aggregation of various video content comprising at least one of the plurality of content segments.

7. The method of claim 6, further comprising configuring the content package to instruct a content player of each of the plurality of user equipment to display an instance of the segment overlay field during playback of the content segment.

8. The method of claim 6, further comprising providing, by the processor executing on the network server, a leaderboard portal to a content generation user equipment associated with the content package, wherein the content generation user equipment initially uploads the content package to the content data store.

9. The method of claim 6, further comprising identifying, by the processor executing on the network server, the dynamic content channel for at least one of the plurality of user equipment based on the generated content leaderboard.

10. The method of claim 9, further comprising generating, by the processor executing on the network server, a content creation request for the at least one of the plurality of user equipment, wherein the content creation request identifies the dynamic content channel.

11. A computer storage medium having computer-executable instructions stored thereon that, in response to execution by a processor of a network server, cause the processor to perform operations comprising:
  retrieving a content package comprising video content from a content data store, wherein the content package is in an initial state when retrieved from the content data store;
  splicing video content from the content package into a plurality of content segments that are configured for playback via a user interface;
  assigning at least one boundary time marker to each of the plurality of content segments such that the video content is assigned a plurality of boundary time markers;
  creating a segment overlay field for each of the plurality of content segments such that a plurality of segment overlay fields are created for the video content, wherein each segment overlay field is configured to receive a client generated metric corresponding to the boundary time marker for each of the plurality of content segments;
  overlaying an instance of the segment overlay field onto a content segment of the plurality of content segments such that the instance of the segment overlay field is presented within the content segment on a user equipment during playback of the content segment that occurs between a boundary time marker indicating a start time of the content segment and a boundary time marker indicating an end time of the content segment, wherein the content package is transformed from the initial state so as to include at least the instance of the segment overlay field the plurality of segment overlay fields;
  providing the content package to a plurality of user equipment including the user equipment;
  receiving a plurality of segmented content responses from the plurality of user equipment;
  extracting client generated metrics from the plurality of segmented content responses;
  aggregating the client generated metrics into a generated content leaderboard, wherein the generated content leaderboard provides suggestions as to content that should be created; and
  generating, based at least in part on the generated content leaderboard, a dynamic content channel comprising an aggregation of various video content comprising at least one of the plurality of content segments.

12. The computer storage medium of claim 11, wherein the operations further comprise configuring the content package to instruct a content player of each of the plurality of user equipment to display an instance of the segment overlay field during playback of the content segment.

13. The computer storage medium of claim 11, wherein the operations further comprise providing a leaderboard portal to a content generation user equipment associated with the content package, wherein the content generation user equipment initially uploads the content package to the content data store.

14. The computer storage medium of claim 11, wherein the operations further comprise identifying the dynamic content channel for at least one of the plurality of user equipment based on the generated content leaderboard.

15. The computer storage medium of claim 14, wherein the operations further comprise generating a content creation request for the at least one of the plurality of user equipment, wherein the content creation request identifies the dynamic content channel.

\* \* \* \* \*